(12) United States Patent
Asakura et al.

(10) Patent No.: US 10,833,310 B2
(45) Date of Patent: Nov. 10, 2020

(54) SECONDARY BATTERY

(71) Applicant: Toyota Jidosha Kabushiki Kaisha, Toyota (JP)

(72) Inventors: Kazuma Asakura, Okazaki (JP); Yasuyuki Takei, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 8 days.

(21) Appl. No.: 16/216,434

(22) Filed: Dec. 11, 2018

(65) Prior Publication Data
US 2019/0198850 A1 Jun. 27, 2019

(30) Foreign Application Priority Data
Dec. 26, 2017 (JP) ................... 2017-249077

(51) Int. Cl.
| | | |
|---|---|---|
| *H01M 2/30* | (2006.01) | |
| *H01M 2/10* | (2006.01) | |
| *H01M 2/20* | (2006.01) | |
| *H01M 2/34* | (2006.01) | |
| *H01M 2/04* | (2006.01) | |

(52) U.S. Cl.
CPC .......... *H01M 2/30* (2013.01); *H01M 2/0486* (2013.01); *H01M 2/1077* (2013.01); *H01M 2/206* (2013.01); *H01M 2/34* (2013.01); *H01M 2/348* (2013.01)

(58) Field of Classification Search
None
See application file for complete search history.

(56) References Cited

U.S. PATENT DOCUMENTS

| | | | |
|---|---|---|---|
| 2013/0089759 A1* | 4/2013 | Han | H01M 2/0408 |
| | | | 429/61 |
| 2015/0118528 A1 | 4/2015 | Byun et al. | |
| 2015/0207133 A1* | 7/2015 | Holl | H01M 2/30 |
| | | | 429/61 |
| 2017/0250394 A1 | 8/2017 | Wakimoto et al. | |

FOREIGN PATENT DOCUMENTS

| | | |
|---|---|---|
| JP | 2015-082500 A | 4/2015 |
| JP | 2017-157334 A | 9/2017 |

* cited by examiner

*Primary Examiner* — Haroon S. Sheikh
*Assistant Examiner* — Alex Rae
(74) *Attorney, Agent, or Firm* — Dinsmore & Shohl LLP (57) ABSTRACT

A secondary battery includes: a battery element; a casing which accommodates the battery element; a positive electrode terminal and a negative electrode terminal provided to the casing and electrically connected to the battery element; and a cut-off portion which switches from a grounded state in which the casing and one terminal of the positive electrode terminal and the negative electrode terminal have an identical potential, to a cut-off state in which the casing and the one terminal are electrically cut off. The one terminal has a facing portion which faces the casing, and the cut-off portion is arranged between the facing portion and the casing. When the casing is externally short-circuited, the cut-off portion switches from the grounded state to the cut-off state by being deformed by heat generated as a short-circuit current flows.

15 Claims, 7 Drawing Sheets

SECONDARY BATTERY

CROSS REFERENCE TO RELATED APPLICATIONS

This nonprovisional application claims priority to Japanese Patent Application 2017-249077 filed on Dec. 26, 2017 with the Japan Patent Office, the entire contents of which are hereby incorporated by reference.

BACKGROUND

Field

The present disclosure relates to a secondary battery.

Description of the Background Art

Conventionally, there have been developed various types of secondary batteries provided with a short circuit mechanism which establishes a short circuit between an external terminal for a positive electrode and an external terminal for a negative electrode when an internal pressure of a casing increases. Such a secondary battery is disclosed, for example, in Japanese Patent Laying-Open No. 2015-082500.

In the secondary battery disclosed in Japanese Patent Laying-Open No. 2015-082500, in a current collecting member which electrically connects a positive electrode of a battery element and an external terminal for the positive electrode, a first fuse portion and a second fuse portion are provided in order from a side closer to the external terminal side, to be spaced from each other. Between the first fuse portion and the second fuse portion, a coupling member which electrically couples the current collecting member and a seal plate of a casing for accommodating the battery element is provided, and the electric resistance of the coupling member is lower than the electric resistance of the external terminal for the positive electrode.

With such a configuration, when a short circuit mechanism is activated and a short-circuit current flows through the seal plate, the coupling member, the current collecting member, and the positive electrode of the battery element in order, the first fuse portion located on the external terminal side can be caused to melt before a short circuit member included in the short circuit mechanism melts. This can suppress a situation where the short circuit member melts first and a current in case of abnormality is taken out of the external terminal.

SUMMARY

Here, in a case where a plurality of secondary batteries are arranged side by side and used as a battery pack, casings of adjacent secondary batteries may be electrically connected, or a casing may be electrically connected to an electrically conductive member located outside the casing, due to an impact from outside or the like. Accordingly, there is a need for a current cut-off mechanism for electrically cutting off a short circuit path when a secondary battery is externally short-circuited via a casing. However, when the current cut-off mechanism is provided between the casings of the secondary batteries or provided to span the casings adjacent to each other, the mechanism becomes large-scaled, and the manufacturing coat thereof also increases.

The present disclosure has bees made in view of the aforementioned problem, and an object of the present disclosure is to provide a secondary battery capable of cutting off a current flowing to a casing which accommodates a battery element when the casing is externally short-circuited, with a simple configuration.

A secondary battery based on the present disclosure includes: a battery element; a casing which accommodates the battery element; a positive electrode terminal and a negative electrode terminal provided to the casing and electrically connected to the battery element; and a cut-off portion which switches from a grounded state in which the casing and one terminal of the positive electrode terminal and the negative electrode terminal have an identical potential, to a cut-off stare in which the casing and the one terminal are electrically cut off. The one terminal has a facing portion which faces the casing, and the cut-off portion is arranged between the facing portion and the casing. When the casing is externally short-circuited, the cut-off portion switches from the grounded state to the cut-off state by being deformed by heat generated as a short-circuit current flows.

With such a configuration, when the casing of the secondary battery is electrically connected to an electrically conductive member located outside the casing and is externally short-circuited, the casing and the one terminal of the positive electrode terminal and the negative electrode terminal can be electrically cut off by the cut-off portion. This can suppress the secondary battery from being damaged.

Further, by adopting a configuration of arranging the cut-off portion between the facing portion, which faces the casing in the one terminal and the casing at a portion facing the facing portion, and electrically cutting off the one terminal and the casing utilizing deformation by the heat generated as the short-circuit current flows, the configuration can be simplified while reducing an installation space.

In the secondary battery based on the present disclosure described above, the cut-off portion may include a melting member having electrical conductivity which melts by the heat generated as the short-circuit current flows to the cut-off portion when the casing is externally short-circuited and an insulating member. In some embodiments, the melting member and the insulating member are arranged side by side between the facing portion and the casing to abut on the facing portion.

With such a configuration, when the casing of the secondary battery is electrically connected to an electrically conductive member located outside the casing and is externally short-circuited, the melting member melts by the heat generated as the short-circuit current flows to the cut-off portion, and thereby the facing portion is supported by the insulating member. Thereby, the one terminal and the casing can be electrically cut off. Further, since the cut-off portion can be configured by arranging the insulating member and the melting member side by side, the configuration can be simplified.

In the secondary battery based on the present disclosure described above, the cut-off portion may include a first metal layer, and a second metal layer having a linear expansion coefficient different from that of the first metal layer. In some embodiments, the first metal layer and the second metal layer are arranged to be stacked in a facing direction in which the facing portion faces the casing.

With such a configuration, when the casing of the secondary battery is electrically connected to an electrically conductive member located outside the casing and is externally short-circuited, the cut-off portion is deformed to be warped by the heat generated as the short-circuit current flows to the cut-off portion. Thereby, the area of the cut-off portion at portions in contact with the facing portion and the casing is reduced, and contact resistance is increased. As a result, a current flowing from the one terminal to the casing can be cut off. In addition, since the cut-off portion is configured by stacking the first metal layer and the second metal layer having linear expansion coefficients different from each other, the configuration of the cut-off portion can be simplified.

In some embodiments, the secondary battery based on the present disclosure described above, the facing portion is located outside the casing.

With such a configuration, since the cut-off portion is arranged between the facing portion and the casing outside the casing, the state of the cut-off portion can be visually checked.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Hereinafter, embodiments of the present disclosure will be described in detail with reference to the drawings. It should be noted that, in the embodiments described below, identical or common parts will be designated by the same reference numerals in the drawings, and the description thereof will not be repeated.

First Embodiment

Figure 1:
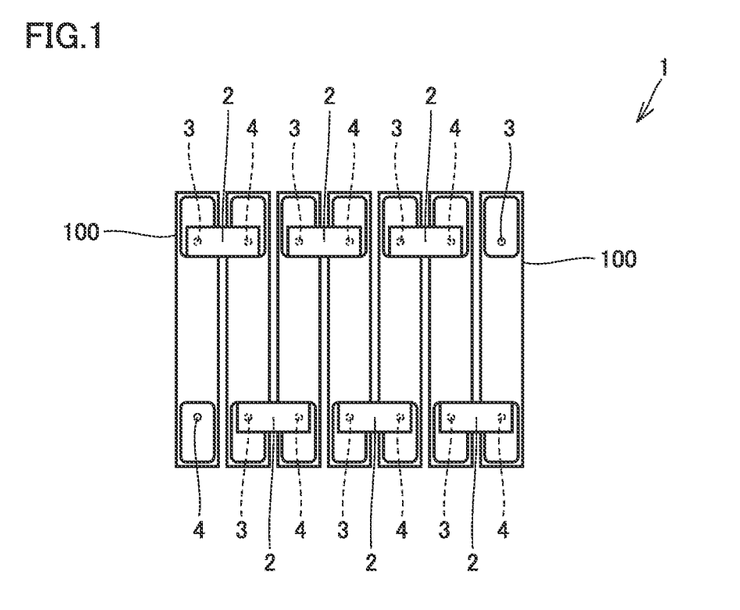
FIG. 1 is a plan view showing a battery pack in accordance with a first embodiment.

FIG. 1 is a plan view showing a battery pack in accordance with a first embodiment. Referring to FIG. 1, a battery pack 1 in accordance with the first embodiment will be described.

As shown in FIG. 1, battery pack 1 is constituted of a plurality of chargeable/dischargeable secondary batteries 100 connected in series. In battery pack 1, the plurality of secondary batteries 100 having the same shape are connected in series to constitute battery pack 1. It should be noted that the number of secondary batteries 100 constituting battery pack 1 is not particularly limited.

Secondary batteries 166 are aligned to be spaced from each other. The plurality of secondary batteries 100 are aligned such that side surfaces having the largest area of secondary batteries 100 face each other. In a gap between two adjacent secondary batteries 100, a cooling plate, a cushioning plate, or the like not shown is arranged.

Secondary battery 100 has a terminal 3 for a positive electrode (positive electrode terminal), and a terminal 4 for a negative electrode (negative electrode terminal). The plurality of secondary batteries 100 are arranged to be alternately reversed such that positive electrode terminal 3 and negative electrode terminal 4 are alternately arranged. The plurality of secondary batteries 100 are arranged such that positive electrode terminal 3 of one of two adjacent secondary batteries 100 is close to negative electrode terminal 4 of the other of two adjacent secondary batteries 100.

Battery pack 1 includes a connector 2 between the terminals which connects adjacent secondary batteries 100 with each other. Connector 2 between the terminals electrically connects positive electrode terminal 3 of one of two adjacent secondary batteries 100 and negative electrode terminal 4 of the other of two adjacent secondary batteries 100. Thereby, the plurality of secondary batteries 100 are connected in series, constituting battery pack 1 having a desired voltage.

Figure 2:
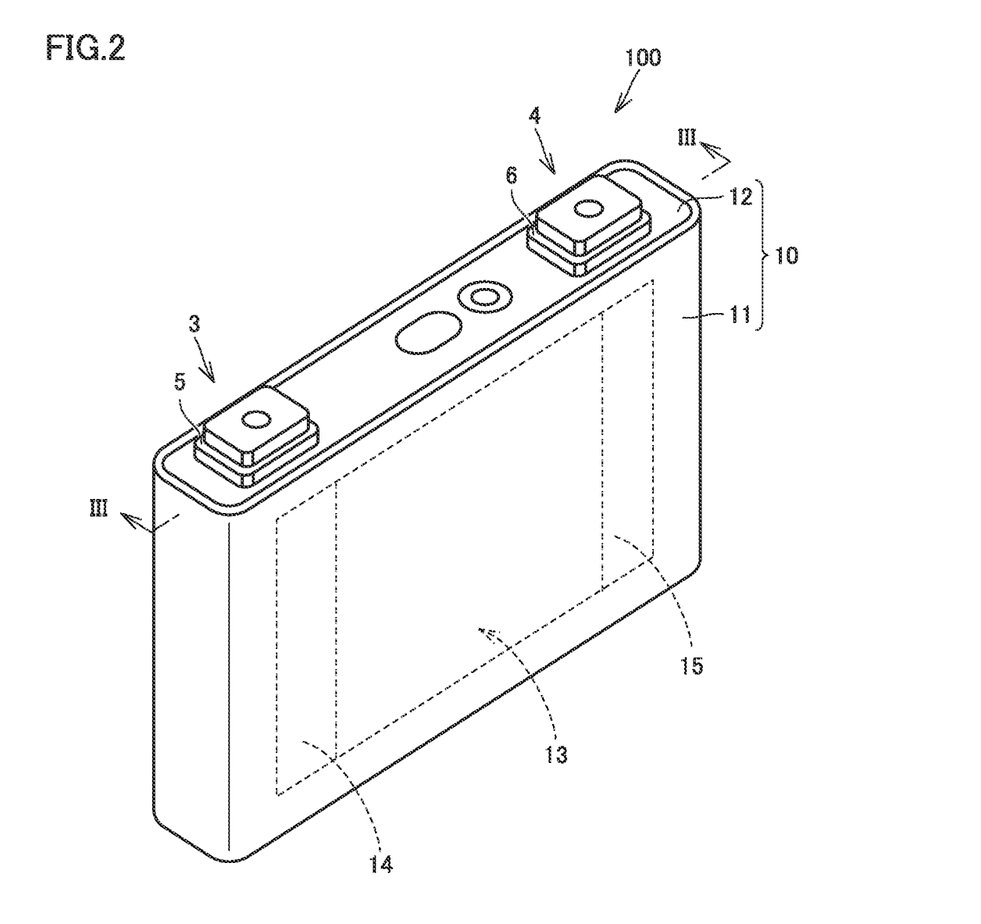
FIG. 2 is a perspective view showing a secondary battery in accordance with the first embodiment.
Figure 3:
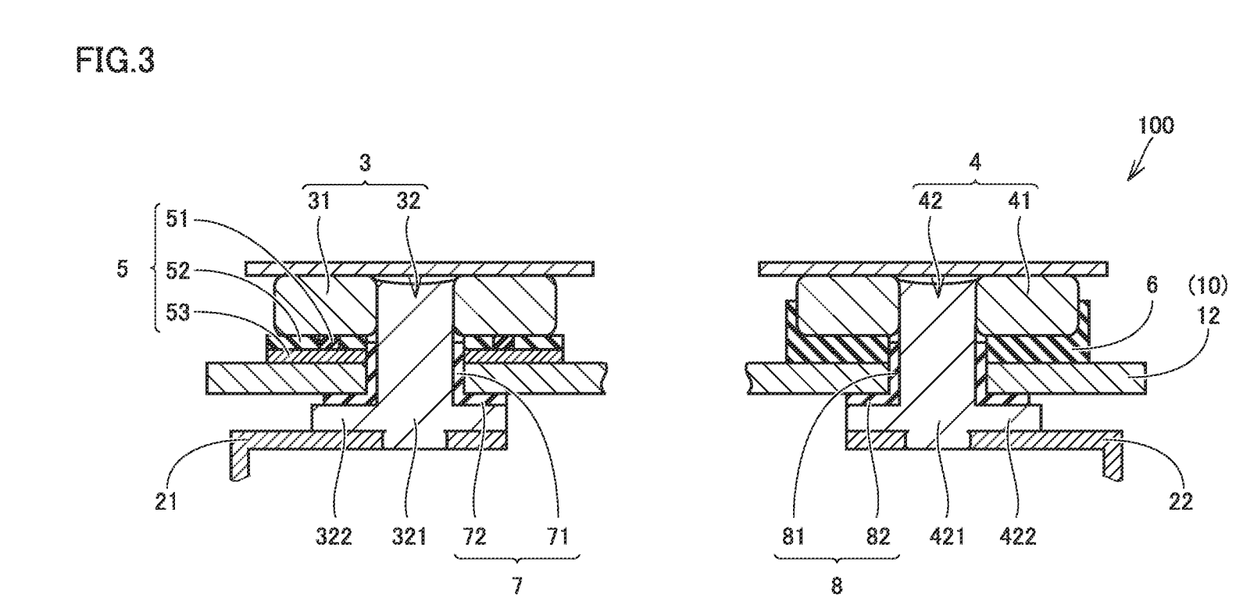
FIG. 3 is a cross sectional view taken along a line III-III shown in FIG. 2.

FIG. 2 is a perspective view showing a secondary battery in accordance with the first embodiment. FIG. 3 is a cross sectional view taken along a line III-III shown in FIG. 2. Referring to FIGS. 2 and 3, secondary battery 100 in accordance with the first embodiment will be described.

As shown in FIGS. 2 and 3, secondary battery 100 in accordance with the first embodiment further includes a casing 10, an electrode body 13 serving as a battery element, a cut-off portion 5, an insulator 6, gaskets 7 and 8, and current collectors 21 and 22.

Casing 10 includes an accommodating portion 11 in the shape of a bottomed rectangular tube, and a seal plate 12 for sealing an opening in accommodating portion 11. Casing 10 accommodates electrode body 13 therein. Positive electrode terminal 3 and negative electrode terminal 4 are attached to casing 10. Specifically, positive electrode terminal 3 and negative electrode terminal 4 are attached to seal plate 12.

Electrode body 13 has a positive electrode core body, a negative electrode core body, and a separator (all not shown), and the positive electrode core body and the negative electrode core body are wound with the separator interposed therebetween. A positive electrode core body exposed portion 14 and a negative electrode core body exposed portion 15 are provided at both ends of electrode body 13.

It should be noted that electrode body 13 may have a structure in which a plurality of positive electrode sheets and negative electrode sheets are stacked with separators sandwiched therebetween.

Positive electrode terminal 3 is provided to penetrate casing 10. Specifically, positive electrode terminal 3 is provided to penetrate seal plate 12 of casing 10. Positive electrode terminal 3 is electrically connected to positive electrode core body exposed portion 14 of electrode body 13 using current collector 21.

Positive electrode terminal 3 includes an external terminal 31 serving as a facing portion, and a coupling terminal 32. External terminal 31 is located outside casing 10. External terminal 31 is arranged to face casing 10. External terminal 31 is composed of a plate-shaped member having a substantially rectangular shape when viewed in a plan view, and having electrical conductivity.

Coupling terminal 32 has a columnar main body portion 321, and a flange portion 322. One end side of main body portion 321 is joined to external terminal 31 with protruding outward from seal plate 12 and being inserted in an insertion hole provided in external terminal 31. The other end side of main body portion 321 is joined to current collector 21 inside casing 10.

Flange portion 322 radially protrudes from main body portion 321, and faces seal plate 12 inside casing 10. Flange portion 322 is substantially parallel to seal plate 12.

Gasket 7 is inserted between seal plate 12 and coupling terminal 32. Gasket 7 is provided in contact with seal plate 12 and coupling terminal 32. Gasket 7 is provided as a sealant between seal plate 12 and coupling terminal 32, and maintains airtightness inside casing 10.

Gasket 7 is formed of an elastic resin material or rubber material, such as PFA (perfluoroalkoxy fluorine resin) or EPDM (ethylene propylene diene rubber).

Gasket 7 has a tube portion 71 and a collar portion 72. Tube portion 71 is inserted in a through hole in seal plate 12. Tube portion 71 is in contact with an inner circumferential surface of seal plate 12 which defines the through hole, and an outer circumferential surface of main body portion 321.

Collar portion 72 is provided to radially protrude from an end portion of tube portion 71 located inside casing 10. Collar portion 72 is sandwiched between seal plate 12 and flange portion 322 inside casing 10.

Negative electrode terminal 4 is provided to penetrate casing 10. Specifically, negative electrode terminal 4 is provided to penetrate seal plate 12 of casing 10. Negative electrode terminal 4 is electrically connected to negative electrode core body exposed portion 15 of electrode body 13 using current collector 22.

Negative electrode-terminal 4 has the substantially same configuration as that of positive electrode terminal 3. Negative electrode terminal 4 has an external terminal 41 composed of a plate-shaped member, and a coupling terminal 42 having a columnar main body portion 421 and a flange portion 422.

Gasket 8 has the substantially same configuration as that of gasket 7. Gasket 8 is inserted between seal plate 12 and coupling terminal 42. Gasket 8 has a tube portion 81 in contact with an outer circumferential surface of main body portion 421 and an inner circumferential surface of seal plate 12 which defines a through hole through which coupling terminal 42 penetrates, and has a collar portion 82 sandwiched between seal plate 12 and flange portion 422 inside casing 10. Gasket 8 is provided as a sealant between seal plate 12 and coupling terminal 42, and maintains airtightness inside casing 10.

Insulator 6 is arranged between external terminal 41 and seal plate 12. Insulator 6 is arranged directly above seal plate 12. Insulator 6 electrically insulates external terminal 41 from seal plate 12.

Cut-off portion 5 is arranged between positive electrode terminal 3 and casing 10. Specifically, cut-off portion 5 is sandwiched between external terminal 31 and seal plate 12. Cut-off portion 5 is configured to switch between a grounded state in which external terminal 31 and casing 10 have an identical potential, and a cut-off state in which external terminal 31 and casing 10 are electrically cut off.

Cut-off portion 5 has an insulating member 51, a melting member 52, and a base member 53. Base member 53 is composed of a plate made of a metal such as aluminum, for example. Base member 53 is placed on a main surface of seal plate 12 located outside casing 10. Coupling terminal 32 penetrates base member 53.

Insulating member 51 and melting member 52 are arranged side by side between external terminal 31 and seal plate 12 to abut on external terminal 31. Specifically, insulating member 51 and melting member 52 are sandwiched between external terminal 31 and seal plate 12.

Insulating member 51 has an annular shape. Insulating member 51 is provided to surround coupling terminal 32. Insulating member 51 is composed of a ceramic material having heat resistance, for example. Thereby, insulating member 51 remains without melting even when melting member 52 melts as described later.

Melting member 52 is provided to surround coupling terminal 32. Melting member 52 is arranged around insulating member 51. Melting member 52 has an annular hole portion, and accommodates insulating member 51 in the annular hole portion.

Melting member 52 is provided to melt by heat generated as a short-circuit current flows through melting member 52 when casing 10 is externally short-circuited. Melting member 52 is composed of a resin layer having electrical conductivity, for example. The resin layer having electrical conductivity contains an electrically conductive filler in the shape of a plurality of particles. By adjusting the content of the electrically conductive filler, the electric resistance of melting member 52 is adjusted such that melting member 52 can melt within a desired time when the short-circuit current flows.

Figure 4:
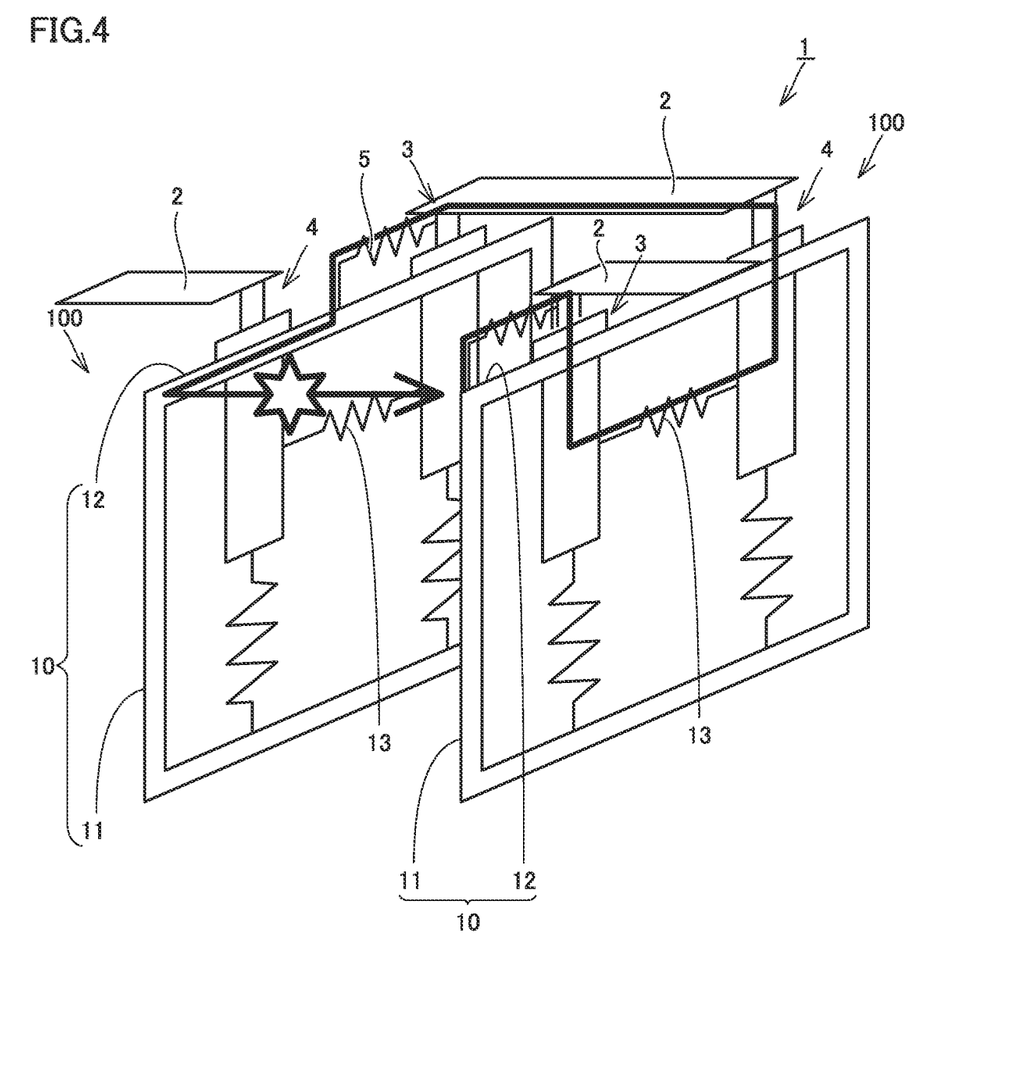
FIG. 4 is a schematic view showing a flow of a current when secondary batteries adjacent to each other in the battery pack in accordance with the first embodiment are externally short-circuited via casings.

FIG. 4 is a schematic view showing a flow of a current when secondary batteries adjacent to each other in the battery pack in accordance with the first embodiment are externally short-circuited via casings. Referring to FIG. 4, the flow of the current when the secondary batteries are externally short-circuited via casings 10 will be described.

As shown in FIG. 4, an external short circuit occurs when casings 10 adjacent to each other are electrically connected due to a collision of a vehicle or the like. Thereby, a current which has flowed from secondary battery 100 on the right side in the drawing, through connector 2 between the terminals, to secondary battery 100 on the left side in drawing flows from casing 10 of secondary battery 100 on the left side in the drawing to casing 10 of secondary battery 100 on the right side in the drawing.

Specifically, the current input from positive electrode terminal 3 of secondary battery 100 on the right side in the drawing, through electrode body 13, negative electrode terminal 4, and connector 2 between the terminals, to positive electrode terminal 3 of secondary battery 100 on the left side in the drawing flows through cut-off portion 5 and casing 10 of secondary battery 100 on the left side in the drawing to casing 10 of secondary battery 100 on the right side in the drawing. That is, a short-circuit current flows through cut-off portion 5.

Figure 5:
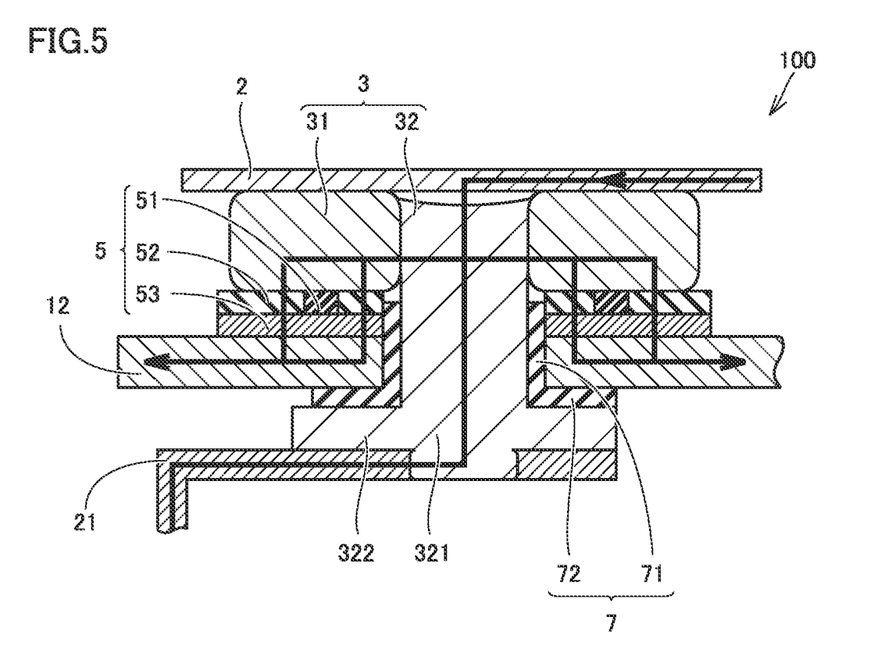
FIG. 5 is a cross sectional view on a positive electrode terminal side of a secondary battery showing a state in which a current flows from a positive electrode terminal of the secondary battery to a casing when an external short circuit occurs as shown in FIG. 4.
Figure 6:
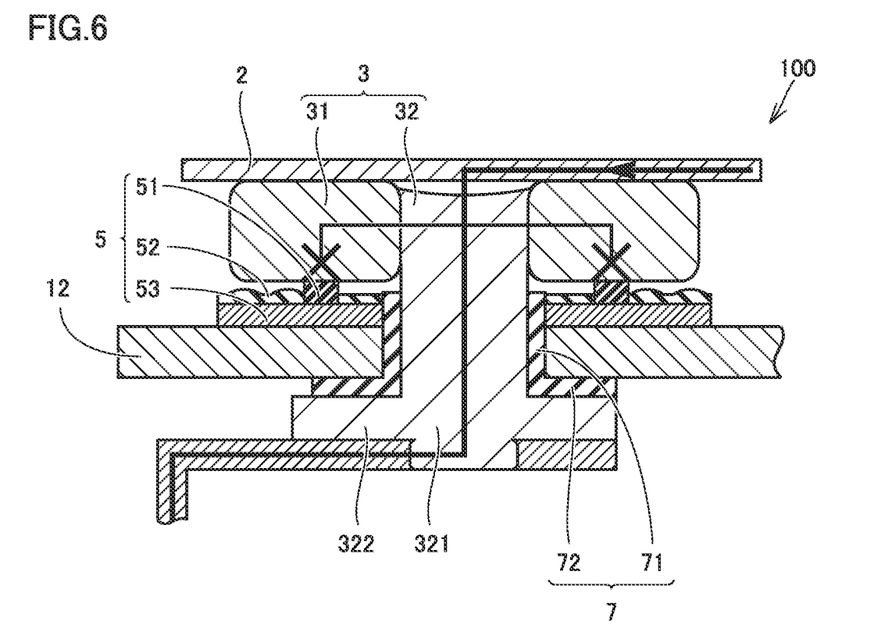
FIG. 6 is a cross sectional view on the positive electrode terminal side of the secondary battery showing a state in which the current flowing from the positive electrode terminal of the secondary battery to the casing when the external short circuit occurs as shown in FIG. 4 is cut off.

FIG. 5 is a cross sectional view on a positive electrode terminal side of a secondary battery showing a state in which a current flows from a positive electrode terminal of the secondary battery to a casing when an external short circuit occurs as shown in FIG. 4. FIG. 6 is a cross sectional view on the positive electrode terminal side of the secondary battery showing a state in which the current flowing from the positive electrode terminal of the secondary battery to the casing when the external short circuit occurs as shown in FIG. 4 is cut off. Referring to FIGS. 5 and 6, a behavior of cut-off portion 5 when a short-circuit current flows to cut-off portion 5 by the external short circuit will be described.

In a state before casing 10 is externally short-circuited, external terminal 31 and casing 10 are grounded as melting member 52 and base member 53 are sandwiched between external terminal 31 and casing 10. When casing 10 is externally short-circuited in such a grounded state, the short-circuit current flows from the positive electrode terminal 3 side, through melting member 52, base member 53, and seal plate 12 in order, as shown in FIG. 5. The magnitude of the short-circuit current is several tens of amperes to several hundreds of amperes, for example. When the short-circuit current flows through melting member 52, Joule heat is generated. As described above, the electric resistance of melting member 52 is adjusted such that melting member 52 can melt within a desired time when the short-circuit current flows.

As shown in FIG. 6, when melting member 52 melts by the heat generated as the short-circuit current flows to cut-off portion 5, insulating member 51 among melting member 52 and insulating member 51 abuts on external terminal 31. Thereby, the cut-off state in which external terminal 31 and seal plate 12 are electrically cut off is established.

As described above, in secondary lottery 100 in accordance with the first embodiment, when casing 10 is electrically connected to an electrically conductive member located outside casing 10 (for example, to a casing of an adjacent secondary battery, or the like) and is externally short-circuited, positive electrode terminal 3 and casing 10 can be electrically cut off by the cut-off portion, which can suppress secondary battery 100 from being damaged.

Specifically, melting member 52 melts by the heat generated as the short-circuit current flows to cut-off portion 5, and thereby external terminal 31 is supported by insulating member 51. Thereby, external terminal 31 and casing 10 can be electrically cut off.

Further, by adopting a configuration of arranging cut-off portion 5 between external terminal 31 and casing 10, and cutting off electrical connection between external terminal 31 and casing 10 utilizing deformation by the heat generated as the short-circuit current flow, the configuration can be simplified while reducing an installation space. Specifically, since cut-off portion 5 can be configured by arranging insulating member 51 and melting member 52 side by side, the configuration can be simplified.

Second Embodiment

Figure 7:
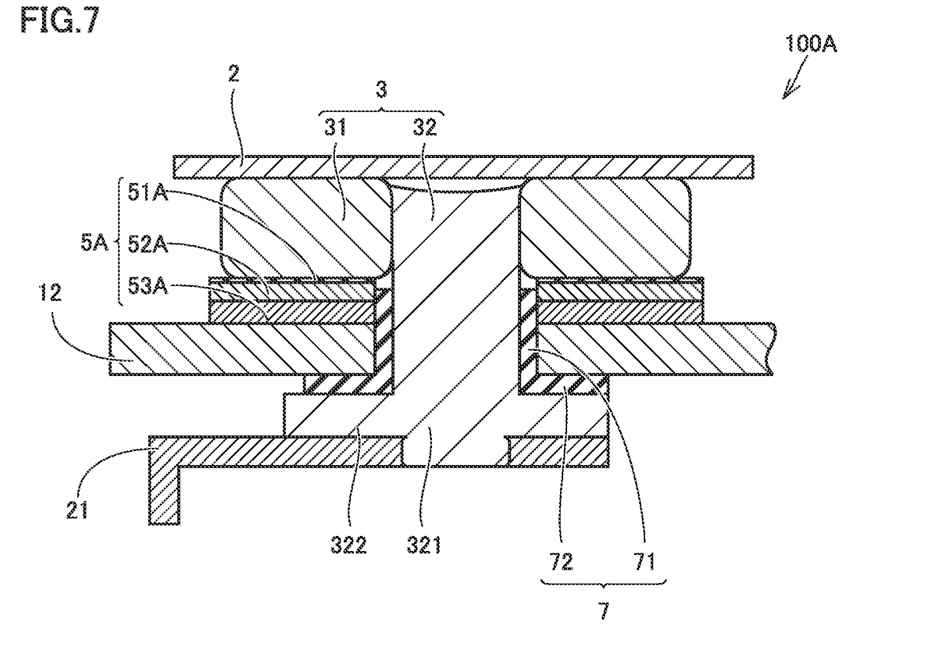
FIG. 7 is a cross sectional view showing a configuration on a positive electrode terminal side of a secondary battery in accordance with a second embodiment.

FIG. 7 is a cross sectional view showing a configuration on a positive electrode terminal side of a secondary battery in accordance with a second embodiment. Referring to FIG. 7, a secondary battery 100A in accordance with the second embodiment will be described.

As shown in FIG. 7, secondary battery 100A in accordance with the second embodiment is different from secondary battery 100 in accordance with the first embodiment in the configuration of a cut-off portion 5A. Other components are substantially identical.

Cut-off ports on 5A has a resin layer 51A having electrical conductivity and heat resistance, a first metal layer 52A, and a second metal layer 53A. Resin layer 51A, first metal layer 52A, and second metal layer 53A are stacked in a facing direction in which external terminal 31 faces seal plate 12. Second metal layer 53A, first metal layer 52A, and resin layer 51A are stacked in order from the seal plate 12 side.

Resin layer 51A, first metal layer 52A, and second metal layer 53A are plate-shaped. Main body portion 321 of coupling terminal 32 penetrates resin layer 51A, first metal layer 52A, and second metal layer 53A.

Resin layer 51A contains an electrically conductive filler in the shape of a plurality of particles. Since resin layer 51A has heat resistance, resin layer 51A is configured not to melt even when a short-circuit current flows, unlike the first embodiment. The electric resistance of resin layer 51A is adjusted as appropriate based on the content of the electrically conductive filler or the like.

The linear expansion coefficient of first metal layer 52A and the linear expansion coefficient of second metal layer 52B are different from each other. For example, the linear expansion coefficient of first metal layer 52A is higher than the linear expansion coefficient of second metal layer 52B.

Figure 8:
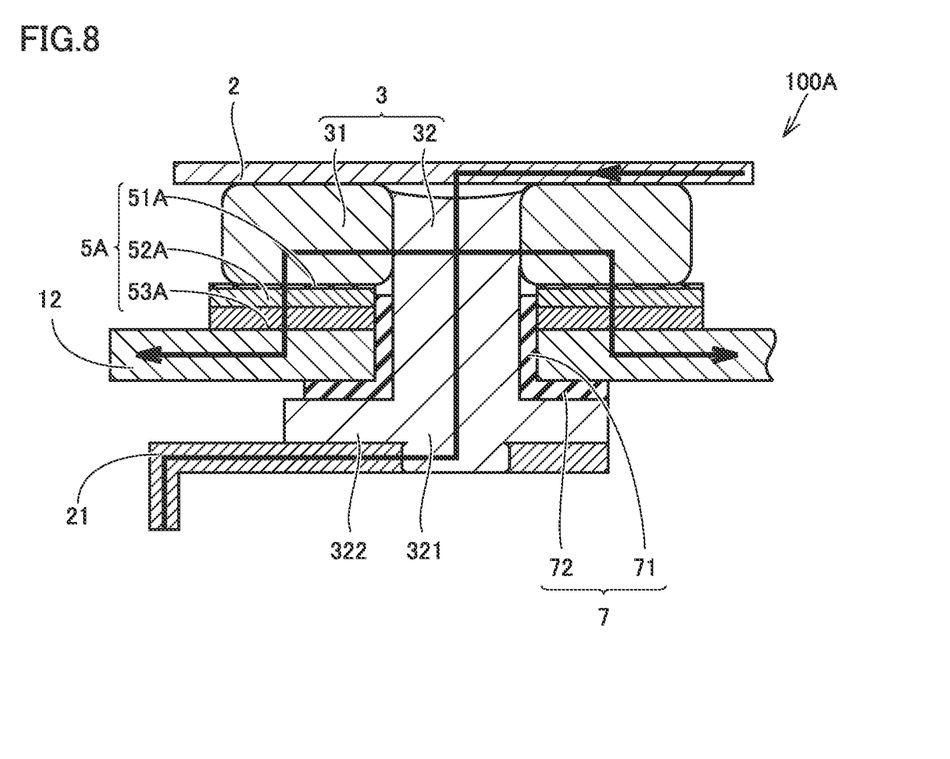
FIG. 8 is a cross sectional view on the positive electrode terminal side showing a state in which a current flows from a positive electrode terminal of the secondary battery to a casing when an external short circuit occurs in the second embodiment.
Figure 9:
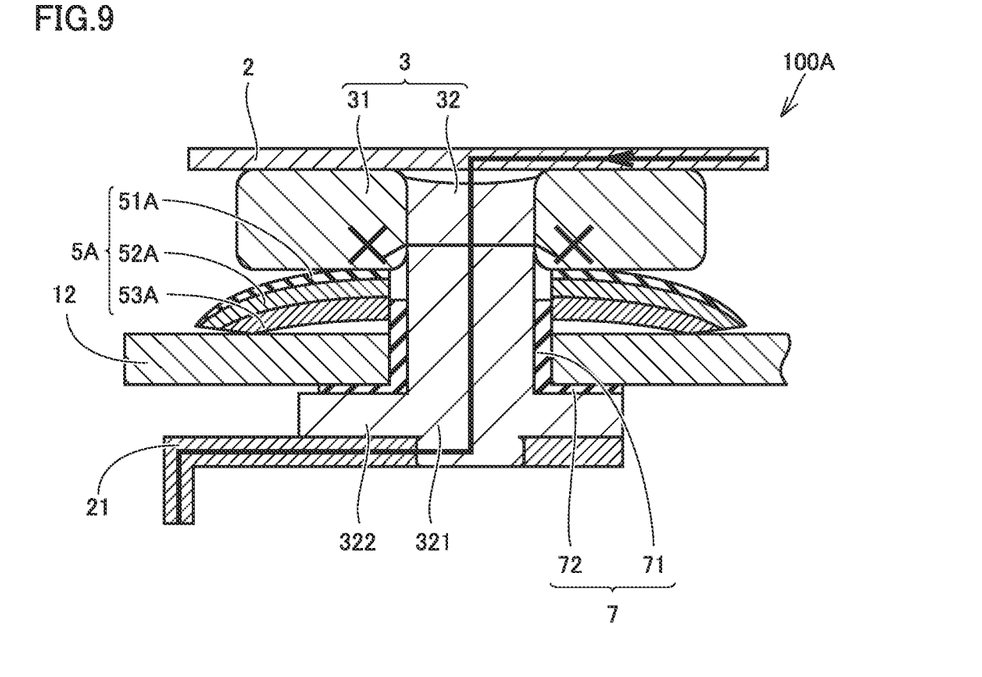
FIG. 9 is a cross sectional view on the positive electrode terminal side showing a state in which the current flowing from the positive electrode terminal of the secondary battery to the casing when the external short circuit occurs is cut off in the second embodiment.

FIG. 8 is a cross sectional view on the positive electrode terminal side showing a state in which a current flows from a positive electrode terminal of the secondary battery to a casing when an external short circuit occurs in the second embodiment. FIG. 9 is a cross sectional view on the positive electrode terminal side showing a state in which the current flowing from the positive electrode terminal of the secondary battery to the casing when the external short circuit occurs is cut off in the second embodiment. Referring to FIGS. 8 and 9, a behavior of cut-off portion 5A when a short-circuit current flows to cut-off portion 5A by the external short circuit will be described.

In a state before casing 10 is externally short-circuited, external terminal 31 and casing 10 are grounded as cut-off portion 5A is entirely sandwiched between external terminal 31 and casing 10. When casing 10 is externally short-circuited in such a grounded state, the short-circuit current flows from the positive electrode terminal 3 side, through resin layer 51A, first metal layer 52A, and second metal layer 53A in order, as shown in FIG. 8. The magnitude of the short-circuit current is several tens of amperes to several hundreds of amperes, for example. When the short-circuit current flows through cut-off portion 5A, Joule heat is generated.

As described above, cut-off portion 5A is configured by stacking first metal layer 52A and second metal layer 53A having different linear expansion coefficients. Accordingly, by heat generated as the short-circuit current flows to cut-off portion 5A, cut-off portion 5A is warped such that the external terminal 31 side becomes convex and the seal plate 12 side becomes concave at a central portion, as shown in FIG. 9. Thereby, the outer edge side of cut-off portion 5A comes into contact with seal plate 12, and the central portion side of cut-off portion 5A comes into contact with external terminal 31.

In this manner, the area in which cut-off portion 5A is in contact with external terminal 31 and seal plate 32 is reduced, and thereby contact resistance is increased. As a result, no current flows to cut-off portion 5A, and the cut-off state in which external terminal 31 and seal plate 12 are electrically cut off is established.

As described above, in secondary battery 100A in accordance with the second embodiment, when casing 10 of the secondary battery is electrically connected to an electrically conductive member located outside casing 10 and is externally short-circuited, cut-off portion 5A is deformed to be warped by the heat generated as the short-circuit current flows to cut-off portion 5A. Thereby, the area of cut-off portion 5A at portions in contact with external terminal 31 and casing 10 is reduced, and contact resistance is increased. As a result a current flowing from external terminal 31 to casing 10 can be cut off. In addition, since cut-off portion 5A is configured by stacking first metal layer 52A and second metal layer 53A having linear expansion coefficients different from each other, the configuration of cut-off portion 5A can be simplified.

It should be noted that, although the second embodiment described above illustrates a case where the linear expansion coefficient of first metal layer 52A is higher than the linear expansion coefficient of second metal layer 53A, the linear expansion coefficient of first metal layer 52A may be lower than the linear expansion coefficient of second metal layer 53A. In this case, cut-off portion 5A is warped such that the external terminal 31 side becomes concave and the seal plate 12 side becomes convex at the central portion. Also in this case, contact resistance is increased, and thereby no current flows to cut-off portion 5A. Accordingly, the cut-off state in which external terminal 31 and seal plate 12 are electrically cut off is established.

Although the first and second embodiments described above adopt a configuration in which external terminal 31 located outside casing 10 is provided as a facing portion and the cut-off portion is provided between external terminal 31 and casing 10, the present disclosure is not limited thereto. Of positive electrode terminal 3, the facing portion which faces casing 10 may be provided inside casing 10, and the cut-off portion may be provided between the facing portion and casing 10. It should be noted that, when the facing portion is provided outside casing 10 as described above, the state of the cut-off portion before and after deformation can be visually checked.

Although the embodiments of the present disclosure have been described, it should be understood that the embodiments disclosed herein are illustrative and non-restrictive in every respect. The scope of the present disclosure is defined by the scope of the claims, and is intended to include any modifications within the scope and meaning equivalent to the scope of the claims.

What is claimed is:

1. A secondary battery comprising:
a battery element;
a casing which accommodates the battery element;
a positive electrode terminal and a negative electrode terminal provided to the casing and electrically connected to the battery element; and
a cut-off portion which switches from a grounded state in which the casing and one terminal of the positive electrode terminal and the negative electrode terminal have an identical potential, to a cut-off state in which the casing and the one terminal are electrically cut off,
the one terminal having a facing portion which faces the casing,
the cut-off portion being arranged between the facing portion and the casing,
when the casing is externally short-circuited, the cut-off portion switching from the grounded state to the cut-off state by being deformed by heat generated as a short-circuit current flows.

2. The secondary battery according to claim 1, wherein the cut-off portion includes a melting member having electrical conductivity which melts by the heat generated as the short-circuit current flows to the cut-off portion when the casing is externally short-circuited, and an insulating member, and
the melting member and the insulating member are arranged side by side between the facing portion and the casing to abut on the facing portion.

3. The secondary battery according to claim 1, wherein the cut-off portion includes a first metal layer, and a second metal layer having a linear expansion coefficient different from that of the first metal layer, and
the first metal layer and the second metal layer are arranged to be stacked in a facing direction in which the facing portion faces the casing.

4. The secondary battery according to claim 1, wherein the facing portion is located outside the casing.

5. The secondary battery according to claim 1, wherein the cut-off portion is sandwiched between and in direct contact with the facing portion and the casing.

6. A secondary battery comprising:
a battery element;
a casing which accommodates the battery element;
a positive electrode terminal and a negative electrode terminal provided to the casing and electrically connected to the battery element; and
a cut-off portion which switches from a grounded state in which the casing and one terminal of the positive electrode terminal and the negative electrode terminal have an identical potential, to a cut-off state in which the casing and the one terminal are electrically cut off,
the one terminal having a facing portion which faces the casing, the one terminal including a coupling terminal that electrically couples a current collector and the facing portion when in the grounded state and when in the cut-off state,
the cut-off portion being arranged between the facing portion and the casing,
when the casing is externally short-circuited, the cut-off portion switching from the grounded state to the cut-off state by being deformed by heat generated as a short-circuit current flows.

7. The secondary battery according to claim 6, wherein the cut-off portion includes a melting member having electrical conductivity which melts by the heat generated as the short-circuit current flows to the cut-off portion when the casing is externally short-circuited, and an insulating member, and
the melting member and the insulating member are arranged side by side between the facing portion and the casing to abut on the facing portion.

8. The secondary battery according to claim 6, wherein the cut-off portion includes a first metal layer and a second metal layer having a linear expansion coefficient different from that of the first metal layer, and
the first metal layer and the second metal layer are arranged to be stacked in a facing direction in which the facing portion faces the casing.

9. The secondary battery according to claim 6, wherein the facing portion is located outside the casing.

10. The secondary battery according to claim 6, wherein the cut-off portion is sandwiched between and in direct contact with the facing portion and the casing.

11. A secondary battery comprising:
a battery element;
a casing which accommodates the battery element;
a positive electrode terminal and a negative electrode terminal provided to the casing and electrically connected to the battery element; and a cut-off portion which switches from a grounded state in which the casing and one terminal of the positive electrode terminal and the negative electrode terminal have an identical potential, to a cut-off state in which the casing and the one terminal are electrically cut off, the one terminal having a facing portion which faces the casing, the cut-off portion being arranged between the facing portion and the casing, the cut-off portion including a base member provided on an outside surface of the casing, an insulating member extending between the facing portion and the base member, and a melting member arranged around the insulating member, when the casing is externally short-circuited, the cut-off portion switching from the grounded state to the cut-off state by being deformed by heat generated as a short-circuit current flows.

12. The secondary battery according to claim 11, wherein the melting member has electrical conductivity which melts by the heat generated as the short-circuit current flows to the cut-off portion when the casing is externally short-circuited, the melting member and the insulating member are arranged side by side between the facing portion and the casing to abut on the facing portion.

13. The secondary battery according to claim 11, wherein the cut-off portion includes a first metal layer, and a second metal layer having a linear expansion coefficient different from that of the first metal layer, and the first metal layer and the second metal layer are arranged to be stacked in a facing direction in which the facing portion faces the casing.

14. The secondary battery according to claim 11, wherein the facing portion is located outside the casing.

15. The secondary battery according to claim 11, wherein the cut-off portion is sandwiched between and in direct contact with the facing portion and the casing.

* * * * *

UNITED STATES PATENT AND TRADEMARK OFFICE
CERTIFICATE OF CORRECTION

PATENT NO. : 10,833,310 B2  
APPLICATION NO. : 16/216434  
DATED : November 10, 2020  
INVENTOR(S) : Kazuma Asakura and Yasuyuki Takei Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), Inventor 1, city, delete "Okazaki" and insert --Okazaki-shi Aichi-ken--, therefor.

Item (72), Inventor 2, city, delete "Toyota" and insert --Toyota-shi Aichi-ken--, therefor.

Item (73), assignee, city, delete "Toyota" and insert --Toyota-shi Aichi-ken--, therefor.

In the Specification

In Column 2, Line(s) 28, after "portion", delete ",".

In Column 2, Line(s) 38, after "short-circuited", insert --,--.

In Column 5, Line(s) 47, after "Negative", delete "electrode-" and insert --electrode--, therefor.

In Column 7, Line(s) 33, delete "lottery" and insert --battery--, therefor.

In Column 7, Line(s) 50, delete "flow," and insert --flows,--, therefor.

In Column 8, Line(s) 60, after "seal plate", delete "32" and insert --12--, therefor.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*